(12) United States Patent
Chase et al.

(10) Patent No.: US 12,529,376 B1
(45) Date of Patent: Jan. 20, 2026

(54) VALVE SEAL FOR RECIPROCATING PUMP

(71) Applicant: GD Energy Products, LLC, Tulsa, OK (US)

(72) Inventors: John Chase, Deer Park, TX (US); Troy Edward Wiegand, Fort Worth, TX (US); James Robert Yanus, Tulsa, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 0 days.

(21) Appl. No.: 18/672,245

(22) Filed: May 23, 2024

Related U.S. Application Data

(60) Provisional application No. 63/504,582, filed on May 26, 2023.

(51) Int. Cl.
*F04B 53/10* (2006.01)

(52) U.S. Cl.
CPC ............................... *F04B 53/1087* (2013.01)

(58) Field of Classification Search
CPC ................................................. F04B 53/1087
See application file for complete search history.

(56) References Cited

U.S. PATENT DOCUMENTS

| | | |
|---|---|---|
| 3,053,500 A | 9/1962 | Atkinson |
| 5,073,096 A | 12/1991 | King et al. |
| 6,382,940 B1 | 5/2002 | Blume |
| 6,544,012 B1 | 4/2003 | Blume |
| 7,186,097 B1 | 3/2007 | Blume |
| 8,528,462 B2 | 9/2013 | Pacht |
| 8,998,593 B2 * | 4/2015 | Vicars ................ F04B 53/007 417/571 |
| D895,777 S | 9/2020 | Chase et al. |
| 10,808,851 B1 * | 10/2020 | Surjaatmadja ......... E21B 41/00 |
| 10,941,765 B2 | 3/2021 | Nowell et al. |
| 10,962,001 B2 | 3/2021 | Nowell et al. |
| 11,131,295 B2 | 9/2021 | Mullins et al. |
| 11,359,739 B2 | 6/2022 | Dyer et al. |
| 11,408,419 B2 | 8/2022 | Foster et al. |
| 11,434,901 B2 | 9/2022 | Nowell et al. |
| 11,486,502 B2 | 11/2022 | Nowell et al. |
| 11,536,378 B2 | 12/2022 | Nowell et al. |
| 11,649,901 B2 | 5/2023 | Jones et al. |
| 11,655,812 B2 | 5/2023 | Foster et al. |
| 2007/0295411 A1 | 12/2007 | Schwegman |
| 2014/0348677 A1 | 11/2014 | Moeller et al. |
| 2015/0144826 A1 * | 5/2015 | Bayyouk ............... F16K 25/005 251/359 |
| 2018/0313456 A1 | 11/2018 | Bayyouk et al. |
| 2019/0011051 A1 * | 1/2019 | Yeung .................... F04B 53/10 |
| 2019/0178243 A1 | 6/2019 | Nowell et al. |

(Continued)

*Primary Examiner* — Patrick C Williams
(74) *Attorney, Agent, or Firm* — Edell, Shapiro & Finnan, LLC

(57) ABSTRACT

A valve component utilized in a fluid end assembly of a high pressure reciprocating pump includes a valve body and a sealing element. The valve component includes a body that defines a recess and includes a tapered sealing section. The sealing element includes a sealing surface and is configured to be positioned within the recess in an assembled configuration of the valve component. The sealing surface of the sealing element is coplanar to the tapered sealing section of the body in the assembled configuration.

20 Claims, 18 Drawing Sheets

(56) References Cited

U.S. PATENT DOCUMENTS

| | | | |
|---|---|---|---|
| 2021/0017982 A1* | 1/2021 | Bayyouk | F16K 25/005 |
| 2021/0095650 A1 | 4/2021 | Nowell et al. | |
| 2022/0412346 A1 | 12/2022 | Nowell et al. | |
| 2023/0116452 A1 | 4/2023 | Nowell et al. | |

* cited by examiner

VALVE SEAL FOR RECIPROCATING PUMP

CROSS-REFERENCE TO RELATED APPLICATIONS

This application claims priority to and the benefit of U.S. Provisional Patent Application No. 63/504,582, entitled "VALVE SEAL FOR RECIPROCATING PUMP," filed May 26, 2023, which is hereby incorporated by reference in its entirety for all purposes.

FIELD OF THE INVENTION

The present invention relates to the field of high pressure reciprocating pumps and, in particular, to the seals utilized in the fluid ends of high pressure reciprocating pumps.

BACKGROUND OF THE INVENTION

High pressure reciprocating pumps are often used to deliver high pressure fluids during earth drilling operations. One or more sealing arrangements are typically provided in the fluid end to seal conduits formed in the fluid end and prevent, or at least discourage, leakage. More specifically, the fluid end may define an internal chamber and one or more conduits may define pathways between the internal chamber and one or more external surfaces of the fluid end. At least some segments of these conduits may be sealed with a sealing assembly (e.g., a cover, plug, and/or sleeve) that includes or defines one or more seals. Additionally or alternatively, some of the segments may include valves that include or define one or more seals. These seals may prevent, or at least discourage, leakage through the conduits.

SUMMARY

The present application relates to techniques for sealing a segment of a fluid end of a high pressure reciprocating pump. The techniques may be embodied as a valve member and/or a sealing assembly that is provided independent of any other elements or that is incorporated in a fluid end as part of a kit, as part of a fluid end, and/or as part of a reciprocating pump. Additionally, the techniques may be embodied as a method for constructing a valve component utilized in a fluid end of a high pressure reciprocating pump.

More specifically, in accordance with at least one embodiment, the present application is directed to a valve component utilized in a fluid end of a reciprocating pump. The valve component includes a sealing element positioned within a recess defined by a body of the valve component. The body includes a tapered sealing section, and the sealing element includes a sealing surface that may be coplanar to the tapered sealing section of the body. Additionally, the recess may lack a cutout extending into the body. The valve component is configured to extend into a bore of a valve seat, and at least one of the tapered sealing section of the body or the sealing surface of the sealing element abuts against an angled section of the valve seat in a closed position of the valve component. The valve seat is devoid of a flattened section connected to the angled section.

In accordance with at least another embodiment, the present application is directed to a valve seat for a reciprocating pump. The valve seat includes a lateral surface, a sealing surface extending obliquely to the lateral surface and defining a bore configured to receive a valve component for the reciprocating pump, and an arcuate portion extending from the lateral surface to the sealing surface.

In accordance to at least a further embodiment, the present application is directed to a valve assembly that includes a valve seat defining a bore and including a first tapered sealing surface, the valve seat being devoid of a flattened section connected to the first tapered sealing surface and extending radially away from the bore. The valve assembly also includes a valve component with a body comprising a sealing section or a sealing element secured to the body and comprising a second tapered sealing surface. At least one of the sealing section and the second tapered sealing surface is configured to abut the first tapered sealing surface of the valve seat in a closed position of the valve component.

BRIEF DESCRIPTION OF THE DRAWINGS

The apparatuses, systems, devices, modules, valve components, valve seats, seals, and/or sealing elements presented herein may be better understood with reference to the following drawings and description. It should be understood that some elements in the figures may not necessarily be to scale and that emphasis has been placed upon illustrating the principles disclosed herein. In the figures, like-referenced numerals designate corresponding parts throughout the different views.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1A:
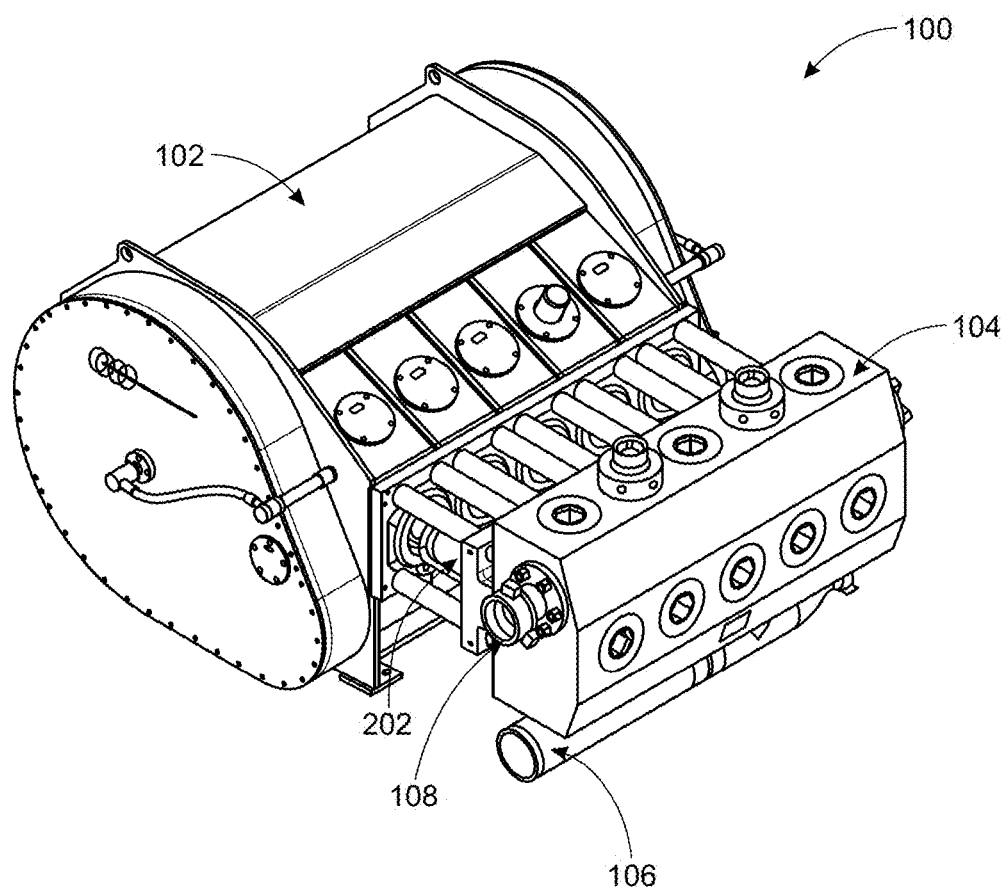
FIG. 1A is a perspective view of a prior art reciprocating pump including a fluid end.

Referring to FIG. 1A, depicted is a prior art reciprocating pump 100. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting and the present application may be applicable to both fracking and drilling operations.

Often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump 100 is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, especially typical "wear" components, and extend the time between maintenance operations (i.e., between downtime) are highly desirable.

Figure 1B:
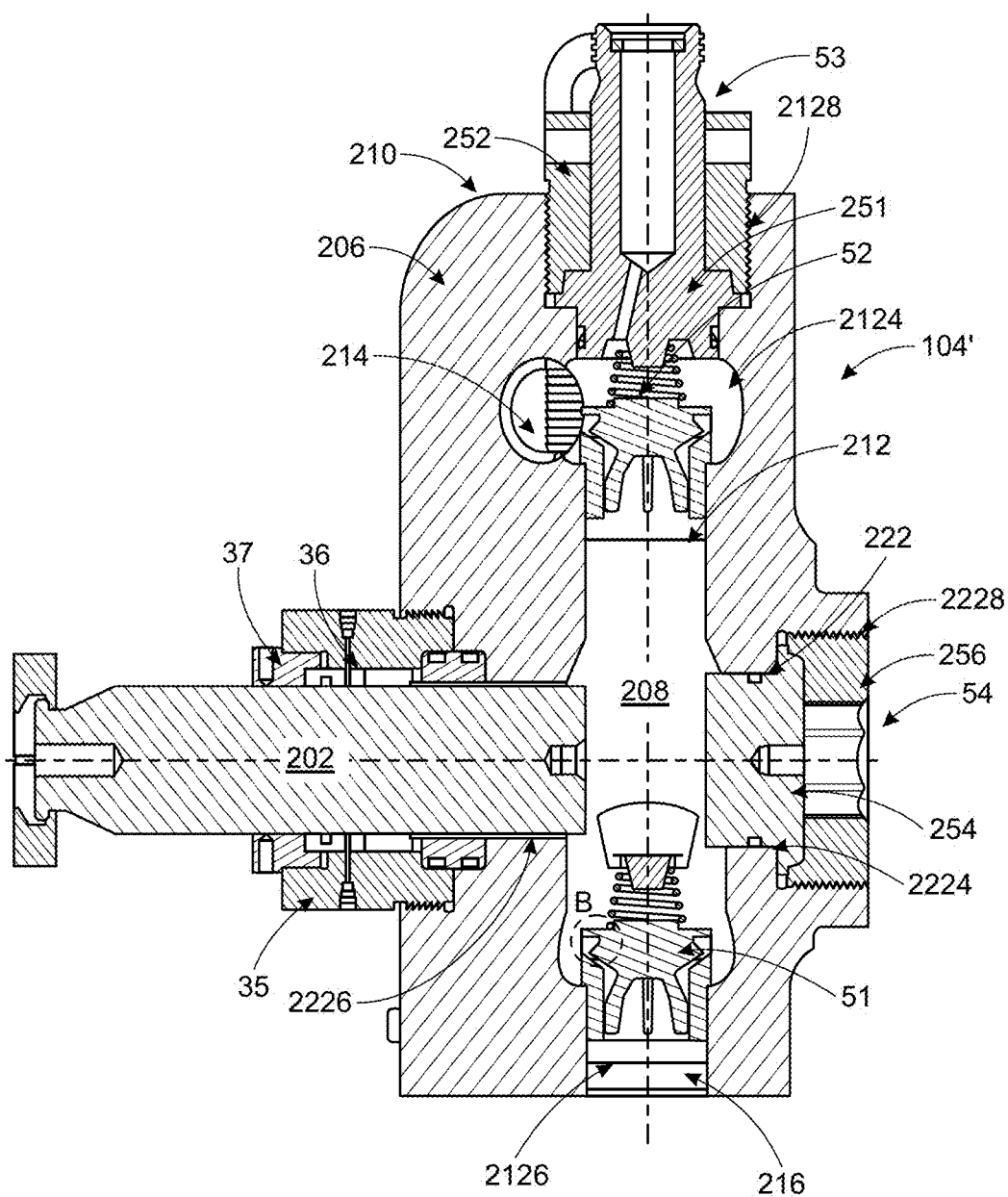
FIG. 1B is a cross sectional view of another prior art fluid end.

Still referring to FIG. 1A, but now in combination with FIG. 1B, in various embodiments, the fluid end 104 may be shaped differently and/or have different features, but may still generally perform the same functions, define similar structures, and house similar components. To illustrate potential shape variations, FIG. 1B shows a side, sectional view of a fluid end 104' with different internal and external shaping as compared to fluid end 104. However, since fluid end 104 and fluid end 104' have many operational similarities, FIGS. 1A and 1B are labeled with the same reference numerals and are both described with respect to these common reference labels.

The sectional view of FIG. 1B is taken along a central or plunger axis of one of the plungers 202 included in a reciprocating pump 100. Thus, although FIG. 1B depicts a single pumping chamber 208, it should be understood that a fluid end 104 can include multiple pumping chambers 208 arranged side-by-side. In fact, in at least some embodiments (e.g., the embodiment of FIG. 1A), a casing 206 of the fluid end 104 forms a plurality of pumping chambers 208 and each chamber 208 includes a plunger 202 that reciprocates within the casing 206. However, side-by-side pumping chambers 208 need not be defined by a single casing 206. For example, in some embodiments, the fluid end 104 may be modular and different casing segments may house one or more pumping chambers 208. In any case, the one or more pumping chambers 208 are arranged side-by-side so that corresponding conduits are positioned adjacent each other and generate substantially parallel pumping action. Specifically, with each stroke of the plunger 202, low pressure fluid is drawn into the pumping chamber 208 and high pressure fluid is discharged from the pumping chamber 208. But, often, the fluid within the pumping chamber 208 contains abrasive material (i.e., "debris") that can damage seals formed in the reciprocating pump 100.

As can be seen in FIG. 1B, the pumping paths and pumping chamber 208 of the fluid end 104 are formed by conduits that extend through the casing 206 to define openings at an external surface 210 of the casing 206. More specifically, a first conduit 212 extends longitudinally (e.g., vertically) through the casing 206 while a second conduit 222 extends laterally (e.g., horizontally) through the casing 206. Thus, the first conduit 212 intersects the second conduit 222 to at least partially (and collectively) define the pumping chamber 208. In the prior art fluid end 104 and prior art fluid end 104', conduits 212 and 222 are substantially cylindrical, but the diameters of conduit 212 and conduit 222 may vary throughout the casing 206 so that conduits 212 and 222 can receive various structures, such as sealing assemblies or components thereof.

Regardless of the diameters of the first conduit 212 and the second conduit 222, each conduit 212 and 222 may include two segments, each of which extend from the pumping chamber 208 to the external surface 210 of the casing 206. Specifically, the first conduit 212 includes a first segment 2124 and a second segment 2126 that opposes the first segment 2124. Likewise, the second conduit 222 includes a third segment 2224 and a fourth segment 2226 that opposes the third segment 2224. In the depicted embodiment, the segments of a conduit (e.g., segments 2124 and 2126 or segments 2224 and 2226) are substantially coaxial while the segments of different conduits are substantially orthogonal. However, in other embodiments, segments 2124, 2126, 2224, and 2226 may be arranged along any desired angle or angles, for example, to intersect pumping chamber 208 at one or more non-straight angles.

In the depicted embodiment, the first conduit 212 defines a fluid path through the fluid end 104. The second segment 2126 is an intake segment that connects the pumping chamber 208 to a piping system 106 delivering fluid to the fluid end 104. Meanwhile, the first segment 2124 is an outlet or discharge segment that allows compressed fluid to exit the fluid end 104. Thus, in operation, segments 2126 and 2124 may include valve components 51 and 52, respectively, (e.g., one-way valves) that allow segments 2126 and 2124 to selectively open. Typically, valve components 51 in the inlet segment 2126 may be secured therein by the piping system 106. Meanwhile, valve components 52 in the first segment 2124 may be secured therein by a closure assembly 53 that, in the prior art example depicted in FIG. 1B, includes a closure element 251 (also referred to as a discharge plug) that is secured in the first segment 2124 by a retaining assembly 252. Notably, the prior art retaining assembly 252 is coupled to the first segment 2124 via threads 2128 defined by an interior wall of the first segment 2124.

On the other hand, the fourth segment 2226 defines, at least in part, a cylinder for the plunger 202 and/or connects the casing 206 to a cylinder for the plunger 202. For example, in the depicted embodiment, a casing segment 35 is secured to the fourth segment 2226 and houses a packing assembly 36 configured to seal against a plunger 202 disposed interiorly of the packing assembly 36. In any case, reciprocation of the plunger 202 in or adjacent to the fourth segment 2226, which may be referred to as a reciprocation segment, draws fluid into the pumping chamber 208 via the second segment 2126 and pumps the fluid out of the pumping chamber 208 via the first segment 2124. Notably, in the depicted prior art arrangement, the packing assembly 36 is retained within casing segment 35 with a retaining element 37 that is threadably coupled to the casing segment 35.

The third segment 2224 is an access segment that can be opened to access to parts disposed within the casing 206 and/or surfaces defined within the casing 206. During operation, the third segment 2224 may be closed by a closure assembly 54 that, in the prior art example depicted in FIG. 1B, includes a closure element 254 (also referred to as a suction plug) that is secured in the third segment 2224 by a retaining assembly 256. Notably, the prior art retaining assembly 256 is coupled to the third segment 2224 via threads 2228 defined by an interior wall of the third segment 2224. However, in some embodiments, the second conduit 222 need not include the third segment 2224 and the second conduit 222 may be formed from a single segment (e.g., the fourth segment 2226) that extends from the pumping chamber 208 to the external surface 210 of the casing 206.

Overall, in operation, fluid may enter the fluid end 104 (or the fluid end 104') via multiple openings, as represented by openings 216 in FIG. 1B, and exit fluid end 104 (or fluid end 104') via multiple openings, as represented by openings 214 in FIG. 1B. In at least some embodiments, fluid enters the openings 216 via pipes of the piping system 106, flows through the pumping chamber 208 (due to reciprocation of the plunger 202), and then flows through the openings 214 into a channel 108. However, the piping system 106 and channel 108 are merely example conduits and, in various embodiments, the fluid end 104 may receive and discharge fluid via any number of pipes and/or conduits, along pathways of any desirable size or shape.

Also, during operation of the pump 100, the first segment 2124 (of the first conduit 212), the third segment 2224 (of the second conduit 222), and the fourth segment 2226 (of the second conduit 222) may each be "closed" segments. By comparison, the second segment 2126 (of the first conduit 212) may be an "open" segment that allows fluid to flow from the external surface 210 to the pumping chamber 208. That is, for the purposes of this application, a "closed" segment may prevent, or at least substantially prevent, direct fluid flow between the pumping chamber 208 and the external surface 210 of the casing 206 while an "open" segment may allow fluid flow between the pumping chamber 208 and the external surface 210. To be clear, "direct fluid flow" requires flow along only the segment so that, for example, fluid flowing from the pumping chamber 208 to the external surface 210 along the first segment 2124 and the channel 108 does not flow directly to the external surface 210 via the first segment 2124.

Figure 2:
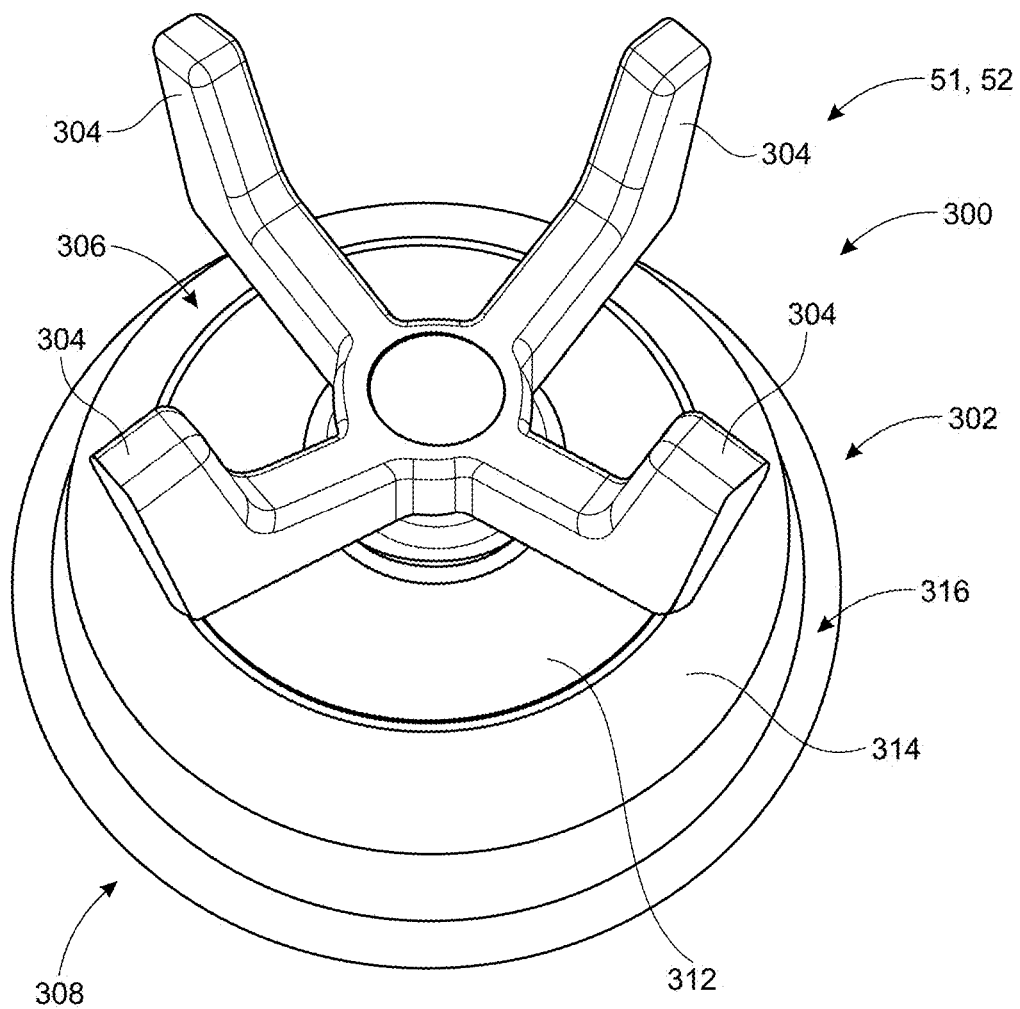
FIG. 2 illustrates a perspective view of a prior art valve body of a valve component that may be utilized in the fluid ends illustrated in FIGS. 1A and 1B, the valve component being shown without a sealing element.

Turning to FIG. 2, illustrated is a perspective view of a valve body 300 of the valve components 51, 52 depicted in FIG. 1B. The valve body 300 may be constructed from a metal, a metal alloy, or other similar materials, and may include a base portion 302 and a series of extension members 304 that extend from the base portion 302. The base portion 302 may have a substantially circular cross section, and may include a first member 306 and a second member 308 connected to one another. In some embodiments, the first member 306 and the second member 308 are formed integrally (i.e., a one-piece or monolithic structure), e.g., via casting, machining, or any other manufacturing techniques. In other embodiments, the first member 306 and the second member 308 are formed separately and coupled to one another via any suitable coupling techniques, such as via welding, fasteners, etc.

The second member 308 may include a central cylindrical protrusion 310 (illustrated in FIG. 4) facing away from the first member 306. The first member 306 of the base portion 302 may include a central section 312 and a sealing section 314. The central section 312 may be substantially planar, and may be parallel to the second member 308. The sealing section 314, however, may be angled with respect to the central section 312 of the first member 306 and with respect to the second member 308. As further illustrated in FIG. 2, the first member 306 of the base portion 302 may be smaller in diameter than the second member 308, and the end of the sealing section 314 of the first member 306 may be offset from the second member 308 to define a recess 316 (e.g., a pocket, a seat, a channel) between the end of the sealing section 314 and the second member 308. The recess 316 may be configured to receive a sealing element.

Continuing with FIG. 2, the series of extension members 304 of the valve body 300 extends from the central section 312 of the first member 306 of the base portion 302 of the valve body 300. In some embodiments, the extension members 304 may be formed uniformly with the base portion 302, while in other embodiments, the extension members 304 may be a separately formed unit that is coupled to the base portion 302. As further described below, the extension members 304 are configured to extend into the central opening of a valve seat to guide the valve component 51, 52 into a sealing position with the valve seat.

Figure 3:
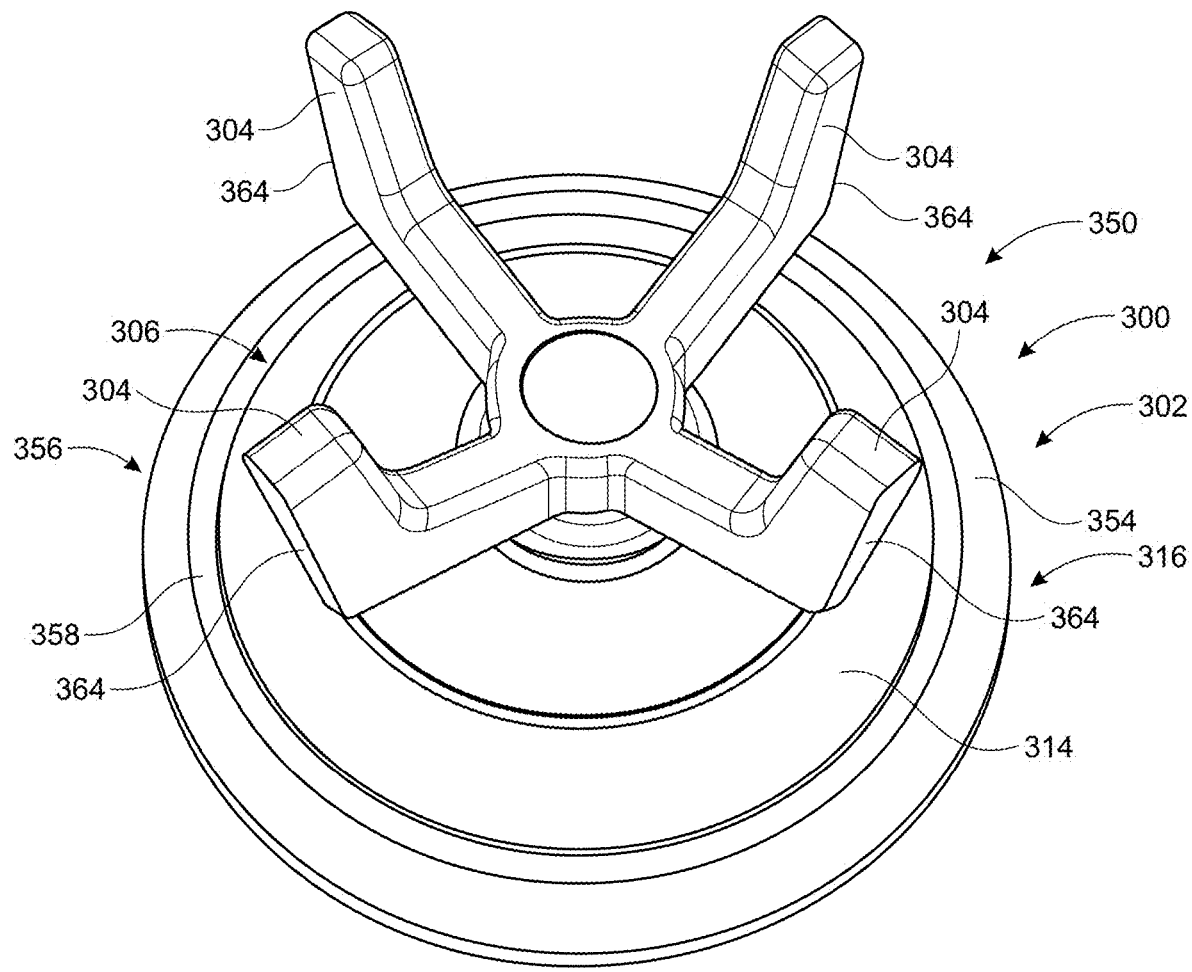
FIG. 3 illustrates a perspective view of a prior art valve component, which is composed of the prior art valve body illustrated in FIG. 2 equipped with a homogeneous elastomeric sealing element.
Figure 4:
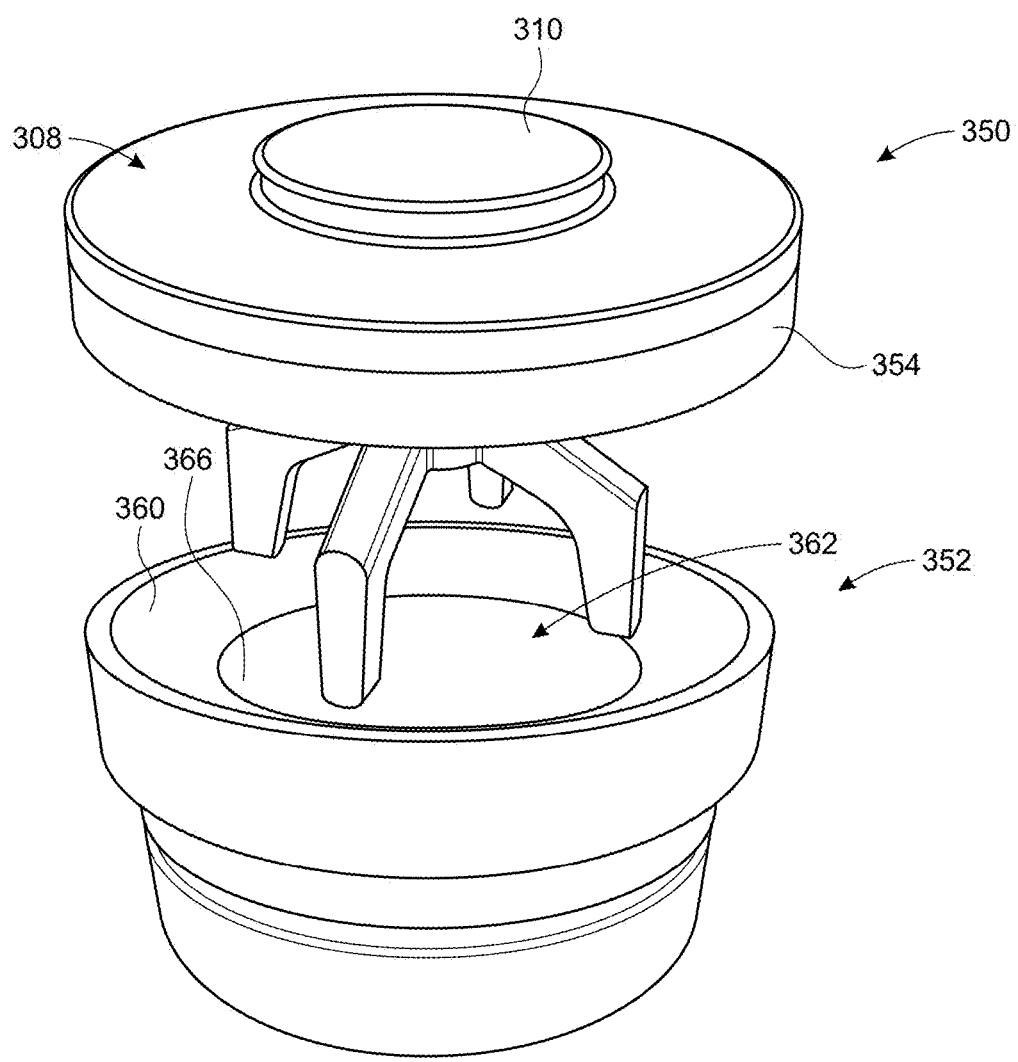
FIG. 4 illustrates a perspective view of the prior art valve component illustrated in FIG. 3 being inserted into a corresponding prior art valve seat to form a sealing arrangement.

Turning to FIGS. 3 and 4, illustrated are views of a prior art valve component 350 representative of the valve components 51, 52 depicted in FIG. 1B. FIG. 4 further illustrates a prior art valve seat 352 representative of that depicted within the chamber 208 of the casing 206 in FIG. 1B. The valve component 350 illustrated in FIG. 3 includes both the metallic valve body 300 illustrated in FIG. 2 and a homogeneous elastomeric sealing element 354 molded onto, adhered, or bonded to the base portion 302 of the metallic valve body's recess 316. The homogeneous elastomeric sealing element 354 forms, in conjunction with the sealing section 314 of the first member 306 of the base portion 302 of the metallic valve body 300, a sealing surface 358 of the valve component 350. The homogeneous elastomeric sealing element 354 forms an outer portion 356 of this sealing surface 358.

As best illustrated in FIGS. 1B and 4, the sealing surface 358 (i.e., the homogeneous elastomeric sealing element 354 and sealing section 314 of the first member 306 of the base portion 302 of the valve body 300) contacts a corresponding sealing surface 360 of the valve seat 352. As the valve component 350 is being translated toward the valve seat 352 to form a seal with the valve seat 352, the extension members 304 extend into the central bore 362 of the valve seat 352. The outer surfaces 364 of the extension members may contact the inner surface 366 of the central bore 362 of the valve seat 352 to position the valve component 350 with respect to the valve seat 352 such that the sealing surface 358 of the valve component 350 is properly aligned with the corresponding sealing surface 360 of the valve seat 352.

Figure 5:
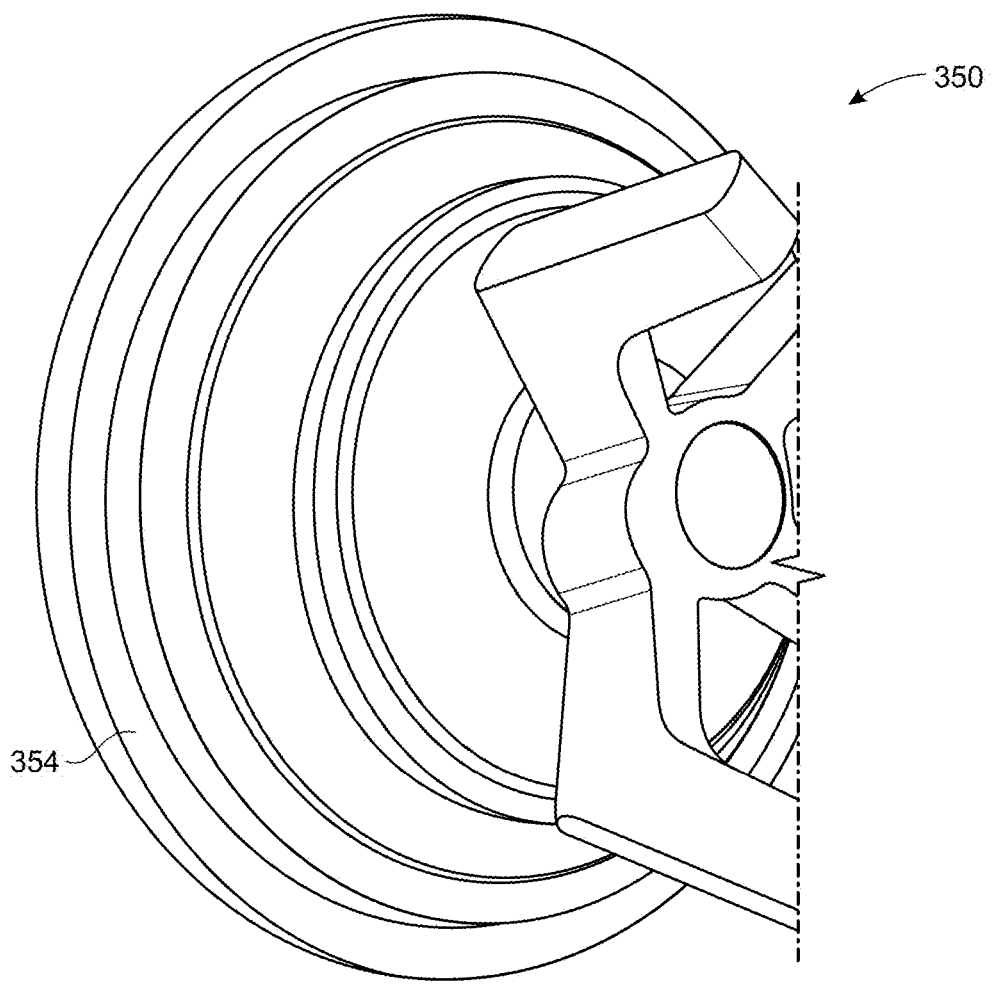
FIG. 5 illustrates a perspective view of the prior art valve component illustrated in FIG. 3 where the sealing element has become worn and damaged.

Turning to FIG. 5, and with continued reference to FIGS. 2, 3, and 4, depicted is a worn and/or damaged homogeneous elastomeric sealing element 354 in which various faces of the homogenous elastomeric sealing element 354 may be deformed, worn, or otherwise changed. Duc to the sustained high pressures, high temperatures, and repeated compressions experienced by the valve component 350, the homogeneous elastomeric sealing element 354 is typically the portion of the valve component 350 that fails. When the homogeneous elastomeric sealing element 354 fails like that illustrated in FIG. 4, the valve component 350 needs to be replaced. Thus, the homogeneous elastomeric sealing element 354 on the valve component 350 is often the most common cause for pump down time.

Figure 6:
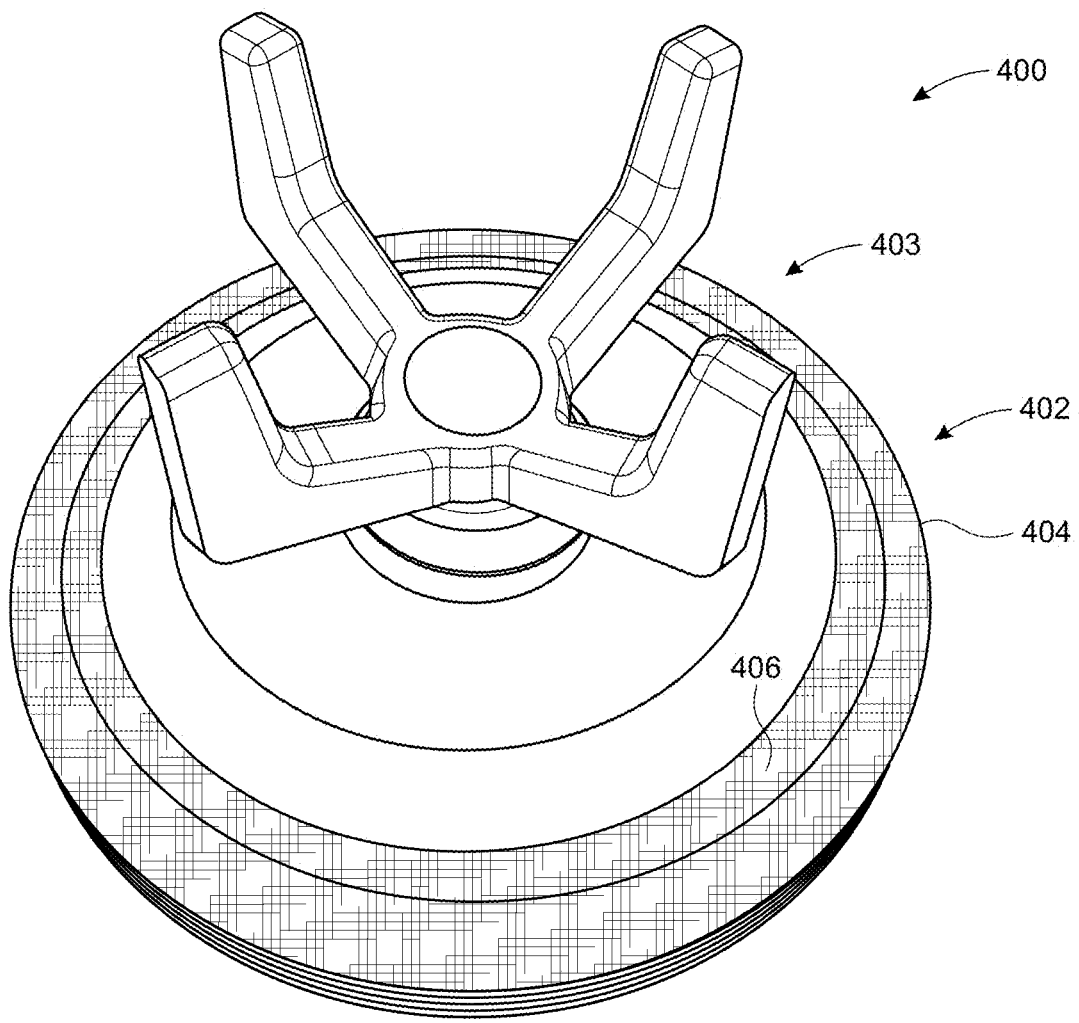
FIG. 6 illustrates a perspective view of a valve component equipped with a fiber reinforced sealing element in accordance with the present invention.

Turning to FIG. 6, illustrated is a valve component 400, like that illustrated in FIGS. 2, 3, and 4, except the valve component 400 illustrated in FIG. 6 is equipped with a fiber reinforced sealing element 402 molded onto a valve body 403. The fiber reinforced sealing element 402 illustrated in FIG. 6 incorporates layers of a woven fabric 404 into an elastomer matrix/material 406 in order to add abrasion resistance and tear resistance to the fiber reinforced sealing element 402. The woven fabrics 404 may be formed from strands, yarns, threads, filaments, and/or fibers weaved together in an ordered manner. The term "strand" as used herein includes a single fiber or filament (e.g., a thread) as well as an ordered assemblage of textile fibers having a high ratio of length to diameter and combined to form a single unit such as a yarn, a cord, a braid, a rope, a bundle, etc. In an example embodiment, a strand is a yarn that includes one or a plurality of fibers (where a plurality of fibers can be twisted together or combined in any other suitable manner to form a single unit). In some embodiments, the woven fabric 404 may be a woven fabric that consists of aramid (e.g., Kevlar) strands/threads/fibers. However, other woven fabrics may be used such as those constructed from any one or more suitable materials including, without limitation, carbon fiber, fiberglass, polyolefins (e.g., polyethylene, polypropylene, etc.), polyesters (e.g., polyethylene terephthalate or PET and poly(trimethylene terephthalate)), polycaprolactam, poly(hexamethylene adipamide), acrylic, polyurethane, acetate, rayon, polyamide (nylon), cotton, cellulosic materials, such as linen, and any selected combinations and/or copolymers thereof. In some embodiments, the elastomeric material 406 may be a rubber-like or clastic material including, without limitation, unsaturated rubbers (e.g., natural polyisoprene, synthetic polyisoprene, polybutadiene, chloroprene rubber (neoprene, butyl rubber, etc.), saturated rubbers (e.g., ethylene propylene rubber, ethylene propylene diene rubber, epichlorohydrin rubber, polyacrylic rubber, silicone rubber, etc.), thermoplastic elastomers, hydrogenated nitrile butadiene rubber (HNBR), nitrile butadiene rubber (NBR), FEPM (Aflas), FKM (viton), and FFKM (Cal-rez and Chem-raz).

The use of a woven fabric 404 has the advantage of increasing the amount of reinforcing material on a weight (wt) by wt % basis above traditional methods (e.g., incorporating a random distribution of short fibers in the elastomer material 406). For example, using traditional methods of randomly distributing short fibers in an elastomeric matrix, one is only able to typically achieve a filler load of approximately 10 wt %. However, using a woven fabric 404 allows for one to achieve a filler load of approximately 80-95 wt %. Moreover, using a woven fabric 404 also allows for one to control the direction of the individual fibers, strands, or threads in the elastomeric materials 406. Thus, incorporating a woven fabric 404 into an elastomeric material 406 allows for the reinforcing effects of the strands/threads/fibers to be maximized with the elastomeric materials 406, which results in an elastomeric material 406 that has an increased resistance to abrasion and tearing. In other words, when utilizing the traditional method of short fiber dispersion in an elastomeric material 406, the direction of the fibers cannot be controlled, and the usefulness of the short fibers as a reinforcing material is not as efficient as that of a woven fabric 404. A short fiber dispersion also risks creating pockets of one weight and other pockets of another, lesser weight, which can create weak points in the elastomeric material 406. In other words, the woven fabric 404 uniformly arranges the fibers to distribute the increased strength and reinforcement more evenly about the fiber reinforced sealing element 402.

Figure 7A:
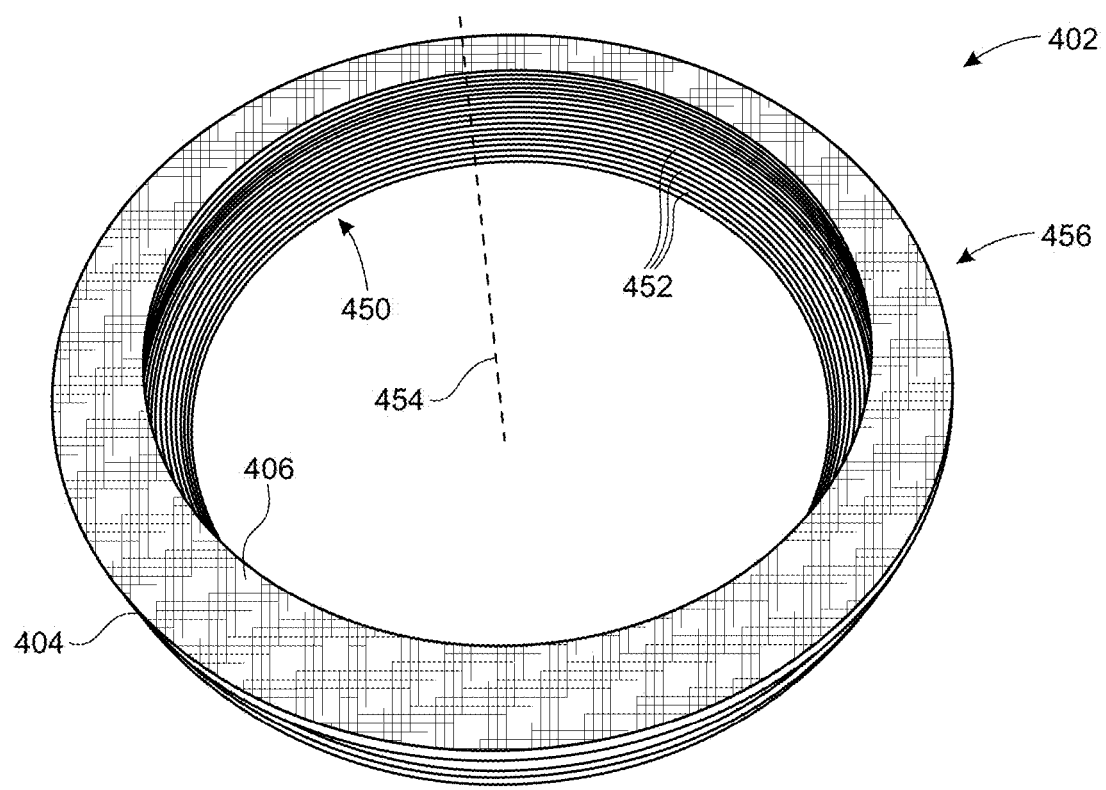
FIG. 7A illustrates a perspective view of the fiber reinforced sealing element illustrated in FIG. 6 isolated from the valve body illustrated in FIG. 2 and prior to installation on the valve body.
Figure 7B:
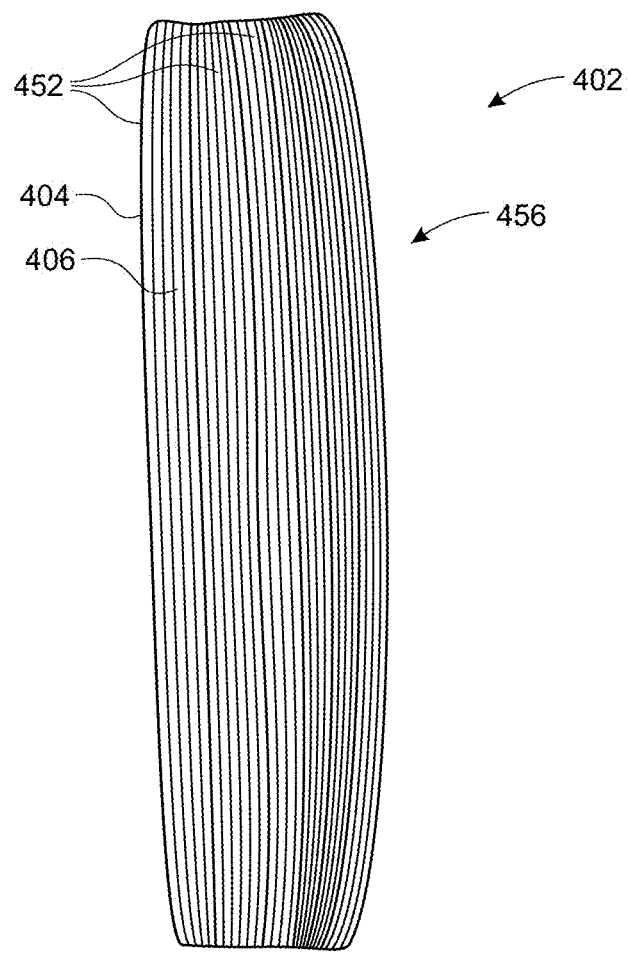
FIG. 7B illustrates a side view of the fiber reinforced sealing element illustrated in FIG. 7A.

Turning to FIGS. 7A and 7B, illustrated is the fiber reinforced sealing element 402 prior to being compression molded to the valve body 403 of the valve component 400. More specifically, FIGS. 7A and 7B illustrate a stack 450 of several layers of fabric panels 452 that include a woven fabric 404 that has been infused with an elastomeric material 406.

In one embodiment, one or more fabric panels 452 may first be woven to a set of desired woven characteristics (e.g., desired weave, desired size, desired strand/thread/fiber orientation, etc.). Moreover, in some instances, the orientation of the strands/threads/fibers may be arranged in a desired position when the fabric is formed. For example, the strands/threads/fibers of the fabric panels 452 may be arranged to be anisotropic/non-stochastic such that the strands/threads/fibers are oriented to extend radially outward from the central axis 454 of an annular shape. The woven fabric panels 452 may then each be overmolded with an elastomeric material 406 such that the elastomeric material 406 becomes infused between the strands/threads/fibers of the woven fabric panel 452 (e.g., the elastomeric material penetrates the weave of the fabric panel 452). Once all the fabric panels 452 have been overmolded or infused with the elastomeric material 406, the overmolded fabric panels 452 may be stacked on top of one another to create a series of layers as best illustrated in FIG. 7B. The stack of overmolded fabric panels 452 may then be cut to a desired shape to create a preform 456. In the illustrated embodiment, the stack of overmolded fabric panels 452 may be cut to an annular shape (e.g., a ring).

In another embodiment, the stack 450 of layers of fabric panels 452 may be formed from a single fabric panel 452 that contains a helical or spiral ramp configuration. In this embodiment, a single continuous woven fabric panel 452 may spiral around the central axis 454 such that several layers are deposited atop one another. Like that of the embodiment where a series of fabric panels 452 are stacked atop one another, the single continuous helical fabric panel 452 may be used to form a preform 456 having a series of layers (as shown in FIGS. 7A and 7B). The single helical fabric panel 452 may be woven to have a set of desired woven characteristics (e.g., desired weave, desired size, desired strand/thread/fiber orientation, etc.), which may be the same or different between the respective layers. The single helical fabric panel 452 may be pre-formed such that it contains an annular shape or may be cut into the annular shape post weaving of the helical fabric panel 452. Again, in the illustrated embodiment, the strands/threads/fibers of the continuous helical fabric panel 452 may be arranged to be anisotropic/non-stochastic such that the strands/threads/fibers are oriented to extend in a particular orientation and/or have specific directionality, e.g., to maximize the strength of the fabric under compression. For example, the strands may be arranged to extend radially outward from the central axis 454 of the helical shape of the continuous helical fabric panel 452. In addition, the elastomeric material 406 may be overmolded onto the single continuous helical fabric panel 452 prior to cutting the fabric panel into the annular shape or may be overmolded onto the single continuous helical fabric panel 452 post cutting the fabric panel into the annular shape. When overmolding the elastomeric material 406 onto the single continuous helical fabric panel 452, the elastomeric material 406 may become infused between the strands/threads/fibers of the single continuous helical fabric panel 452 (e.g., the elastomeric material 406 may penetrate the weave of the single continuous helical fabric panel 452).

Still further, although not shown, in some embodiments, a preform 456 might be created by rolling one or more layers of fabric into an annular shape (e.g., a toroidal shape). However, regardless of the embodiment of the preform 456 (i.e., a series of stacked woven fabric panels 452, a single continuous helical woven fabric panel 452, combination of the two, etc.), once the fabric panel(s) 452 have been formed (e.g., cut, pre-formed, etc.) into a desired shape to create the preform 456, the preform 456 may be installed/disposed onto a recess 502 of the base portion of the valve body 403 like that illustrated in FIG. 8. When the preform 456 is disposed onto the recess 502, the various strands/threads/fibers of the preform 456 may be oriented such that they extend radially from a central section 504 of a first member 506 of a base portion 508 of the valve body 403.

In yet another embodiment, the preform 456 may be created by applying the woven fabric 404 to an exterior surface of the elastomeric material 406. By way of example, a flexible sheet of the woven fabric 404 may be provided and wrapped around the elastomeric material 406 or other base sealing element (e.g., a homogenous or heterogenous material). In this way, the elastomeric material 406 is coated with the woven fabric 404 to provide an abrasion resistant and tear resistant outer surface that may be uniformly distributed about the elastomeric material 406. In some embodiments, multiple layers of the woven fabric 404 can be arranged on the elastomeric material 406, such as by wrapping the elastomeric material 406 multiple times and/or folding the woven fabric 404 on itself before applying the woven fabric 404 to the elastomeric material 406, thereby providing additional resistance for the elastomeric material 406. Moreover, the woven fabric 404 can be applied to select portions of the elastomeric material 406, such as around an entire outer boundary or perimeter of the elastomeric material 406 and/or to a specific portion of the outer boundary of the elastomeric material 406.

Figure 8:
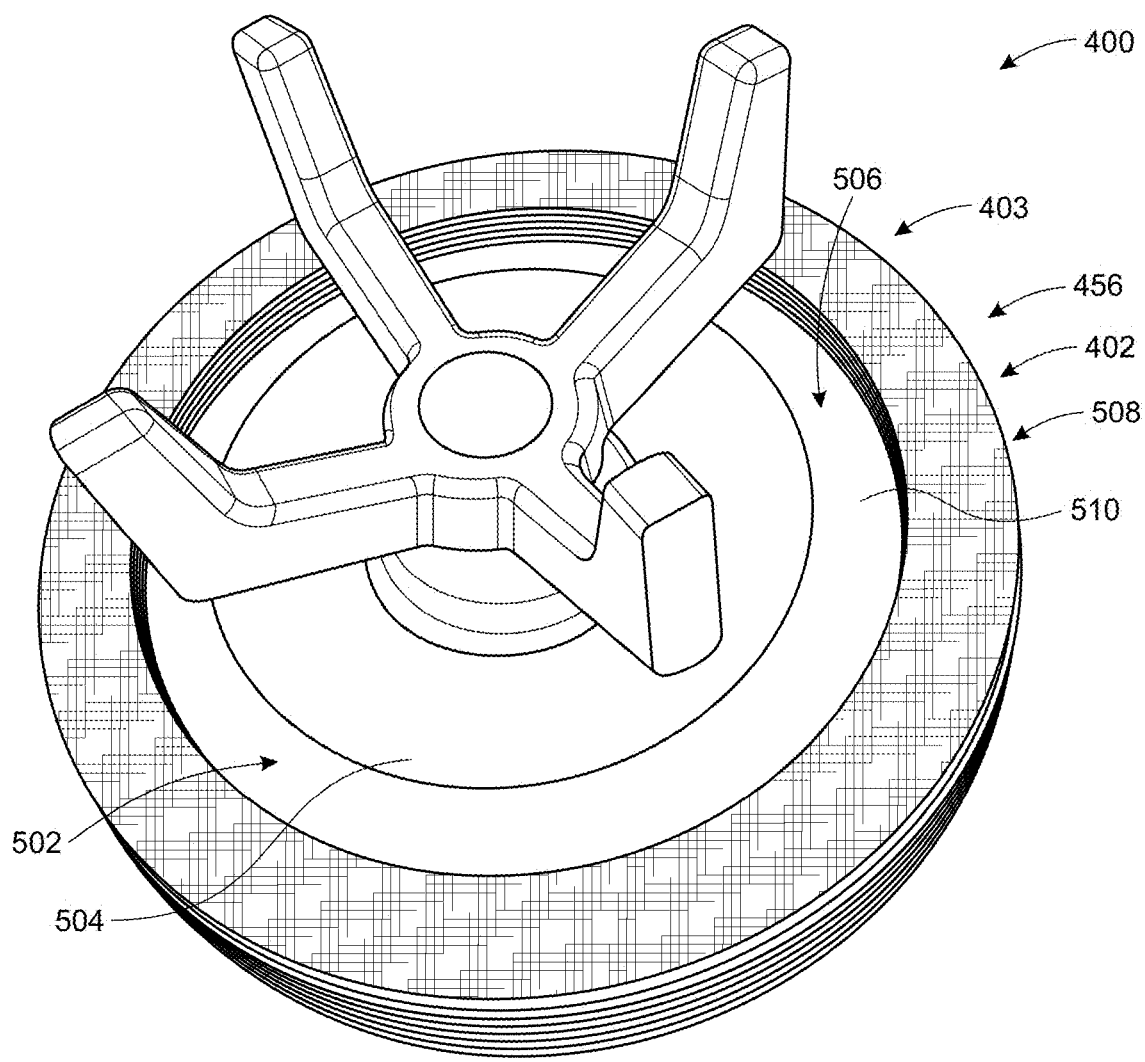
FIG. 8 illustrates a perspective view of the fiber reinforced sealing element illustrated in FIG. 7A being disposed on the valve body illustrated in FIG. 2 prior to the fiber reinforced sealing element being molded.
Figure 9:
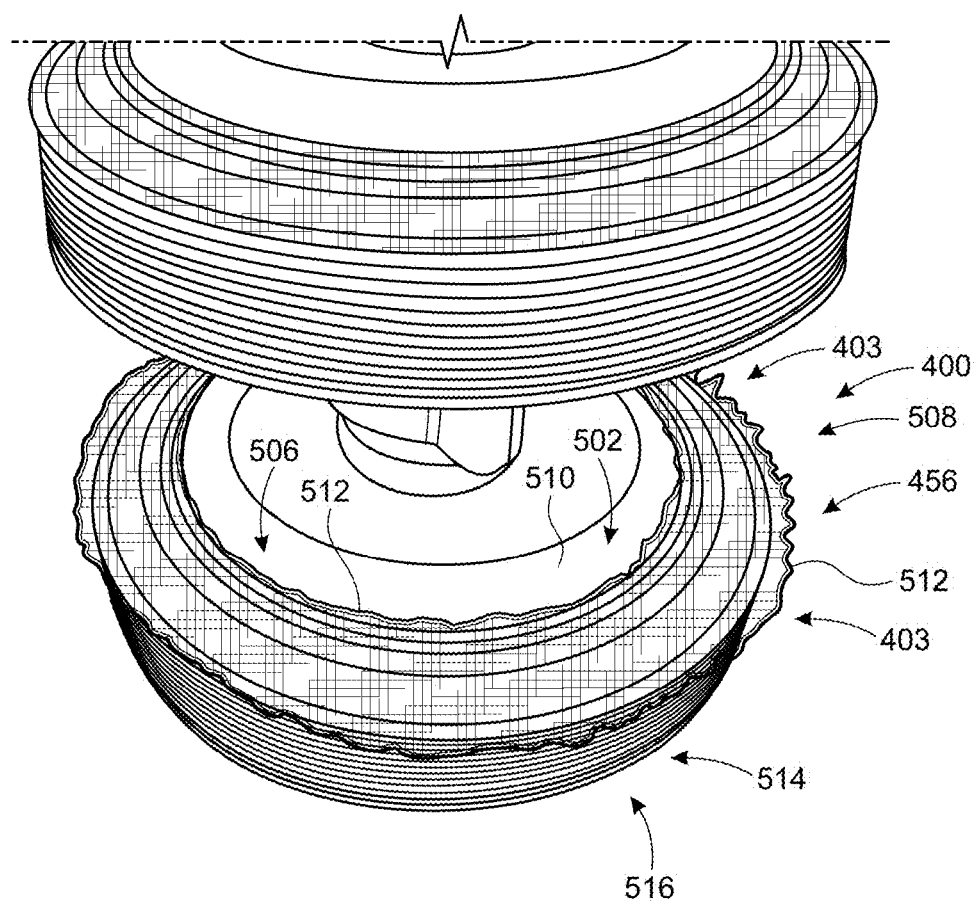
FIG. 9 illustrates a perspective view of the fiber reinforced sealing element illustrated in FIG. 7A after being molded onto the valve body illustrated in FIG. 2.
Figure 10A:
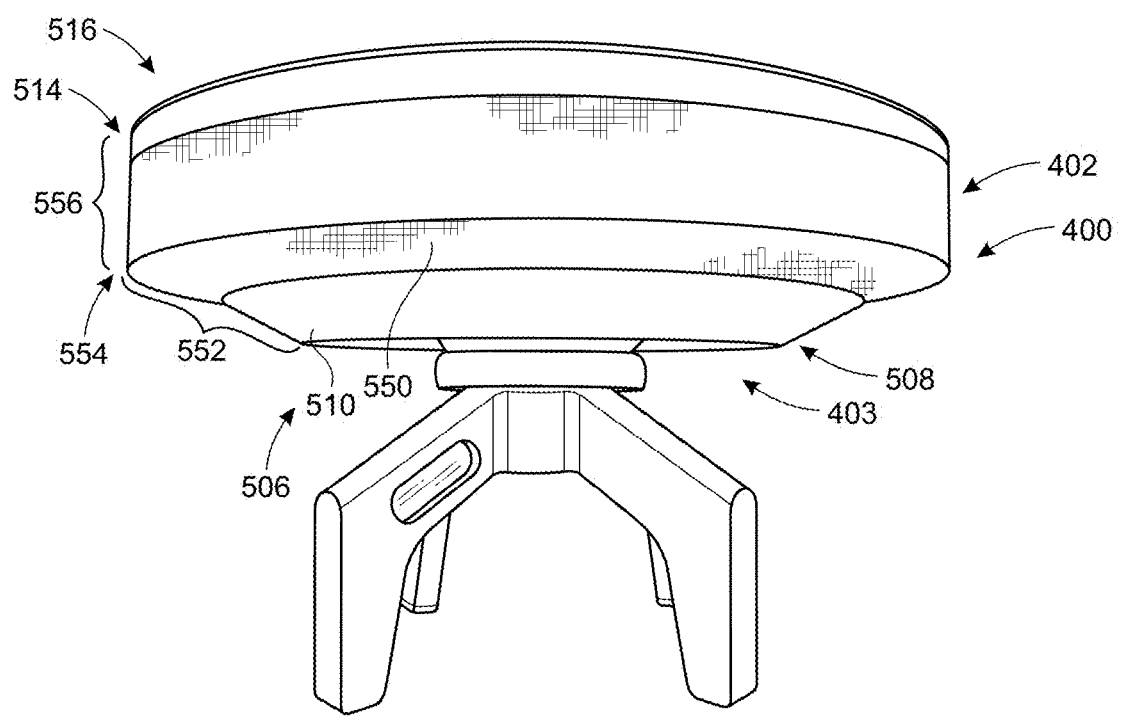
FIG. 10A illustrates a side view of the valve component illustrated in FIG. 6.
Figure 10B:
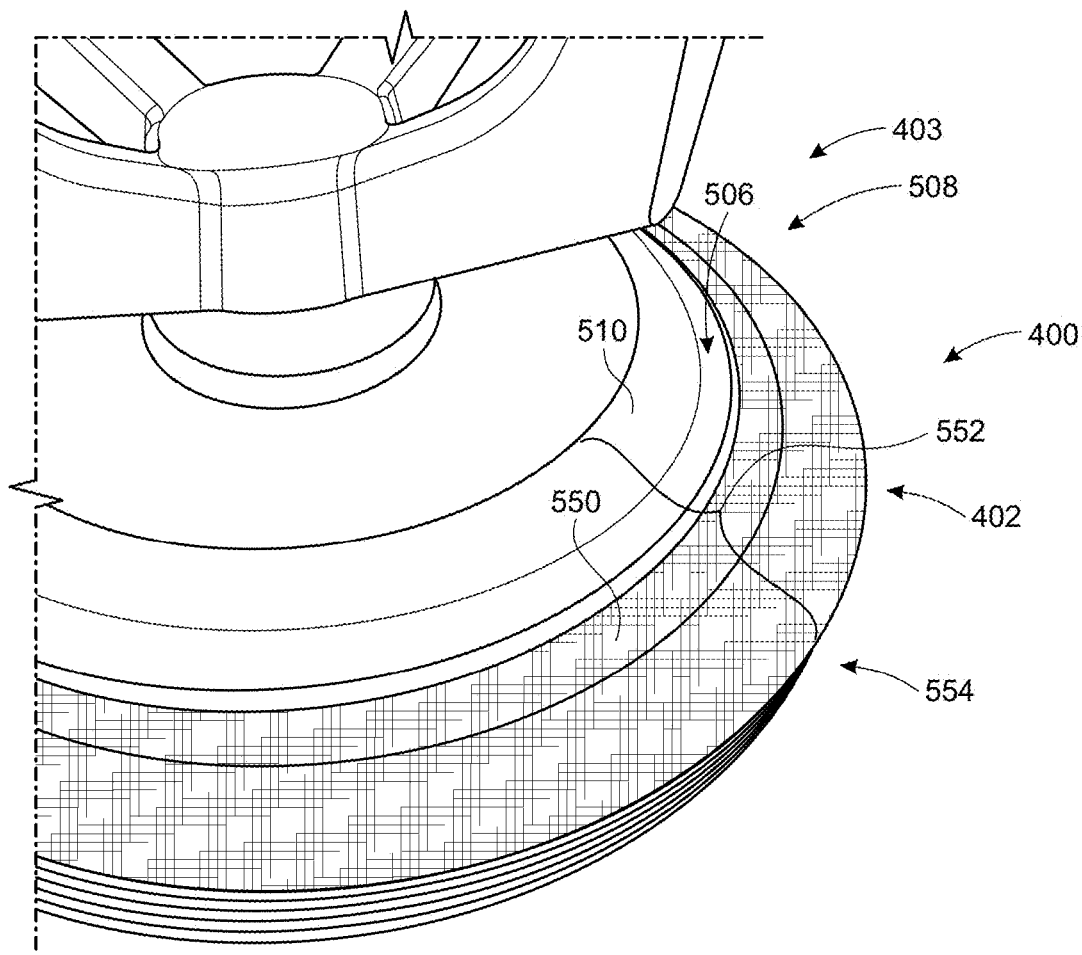
FIG. 10B illustrates a perspective view of a sealing surface of the valve component illustrated in FIG. 6.

As further illustrated in FIG. 8, when the preform 456 is disposed on the recess 502, the preform 456 surrounds a scaling section 510 and the central section 504 of the first member 506 of the base portion 508, and the height of the preform 456 may extend beyond both the scaling section 510 and the central section 504 of the first member 506 of the base portion 508. Once the preform 456 has been disposed on the recess 502, the preform 456 may be compression molded (e.g., with both heat and compression) onto the recess 502. Compression molding the preform 456 serves to adhere the multiple layers of the preform 456 to one another via the bonding of the overmolded elastomeric material 406 of each layer to one another. In other words, compression molding causes the elastomeric material 406 overmolded onto one fabric layer to bond to the elastomeric material 406 overmolded onto the adjacent fabric layers to create structure from the preform 456 in which the various layers are indiscernible from one another. Moreover, as best illustrated in FIG. 9, compression molding the preform 456 while the preform 456 is disposed on the recess 502 further causes the preform 456 to adhere to the recess 502. When the preform 456 is compression molded, the height of the molded structure (e.g., the fiber reinforced scaling element 402) is reduced to align with the scaling section 510 of the first member 506 of the base portion 508. However, as further illustrated in FIG. 9, the fiber reinforced sealing element 402, after being compression molded, may contain excess material 512 that requires the fiber reinforced sealing element 402 to be trimmed. The excess material 512 may extend over the sealing section 510 of the first member 506, and may extend beyond the outer perimeter 514 of the recess 502 and/or a second member 516 of the base portion 508 of the valve body 403. Turning to FIGS. 10A and 10B, and with continued reference to FIG. 9, illustrated a finished valve component 400 where the fiber reinforced sealing element 402 has been fully trimmed. As illustrated, the sealing surface 550 of the fiber reinforced sealing element 402 aligns with the sealing section 510 of the first member 506 of the base portion 508 of the valve body 403 to create a continuous valve sealing surface 552. The fiber reinforced sealing element 402 and the sealing section 510 of the base portion 508 of the valve body 403 can collectively contact the corresponding sealing surface of a valve seat 352 (shown in FIG. 4) to form a seal between the valve component 400 and the valve seat 352. Or, one of the sealing surface 550 of the fiber reinforced sealing element 402 or the sealing section 510 of the base portion 508 may contact a corresponding sealing surface of a valve seat 352 (shown in FIG. 4) to form a seal between the valve component 400 and the valve seat 352. In addition, the outer perimeter 554 of the fiber reinforced sealing element 402 has been trimmed to align with the outer perimeter 514 of the second member 516 of the base portion 508 of the valve component 400 such that the outer perimeter 514 of the second member 516 of the base portion 508 and the outer perimeter 554 of the fiber reinforced sealing element 402 collectively form an outer perimeter surface 556 of the base portion 508 of the valve component 400.

Figure 11A:
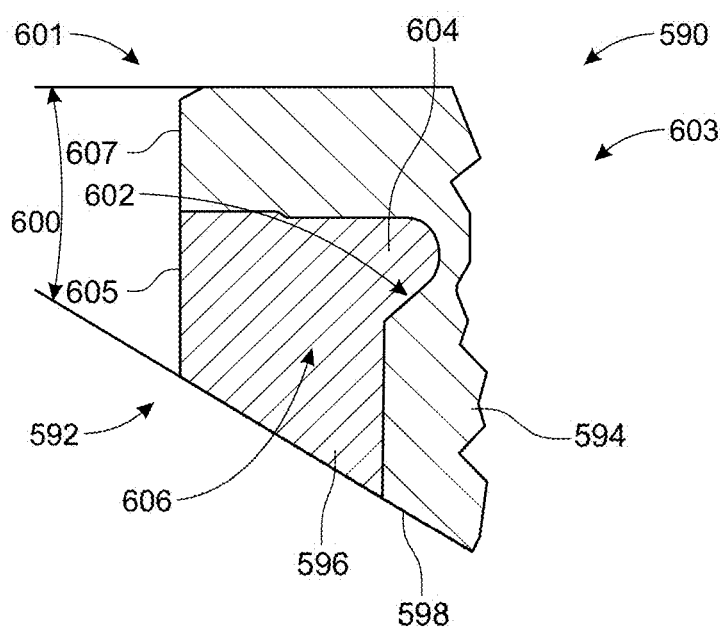
FIG. 11A shows a side sectional view of a portion of an example embodiment of a fiber reinforced sealing element installed on a valve component.

Now turning to FIG. 11A, which illustrates a valve component 590 with a sealing element 592, the illustrated sealing element 592 generally aligns with dimensions of a valve body 594. As an example, a sealing surface 596 of the sealing element 592 is substantially coplanar/collinear with a sealing section 598 of the valve component 590 in an assembled configuration of the valve component 590. That is, in the assembled configuration, the sealing element 592 is secured to the valve body 594 to enable both the sealing surface 596 and the sealing section 598 to sit on, engage with, or abut a sealing surface 360 of a valve seat 352 when the valve component 590 is disposed in a closed position. To this end, the sealing surface 596 of the sealing element 592 and the sealing section 598 of the valve component 590 on which the sealing element 592 is installed may be angled or tapered at the same taper or angle 600 with respect to a planar member 601 of a base portion 603 of the valve component 590. In the depicted embodiment, this is achieved by forming the sealing element 592 to include a sealing surface 596 that is sloped at an angle 600 equal to or between approximately 21° and approximately 23° (e.g., approximately) 22°. As another example, a lateral surface 605 of the sealing element 592 is substantially coplanar/collinear with an outer perimeter 607 of the planar member 601 in the assembled configuration of the valve component 590 such that the lateral surface 605 of the sealing element 592 and the outer perimeter 607 of the planar member 601 are flush with one another.

Additionally, the valve body 594 includes a recess 606 with a cutout 602 (e.g., an undercut) extending into the base portion 603 and formed between the sealing section 598 and the planar member 601 of the base portion 603. In some embodiments, the cutout 602 may help facilitate securement of the sealing element 592 within the recess 606. As an example, the portion of the valve body 594 defining the cutout 602 can capture a part (e.g., a protrusion 604) of the sealing element 592 to provide a hook-like engagement between the sealing element 592 and the valve body 594 that blocks removal of the sealing element 592 from within the cutout 602, thereby securing the sealing element 592 to the valve body 594.

In some embodiments, the sealing element 592 (e.g., the fiber reinforced sealing element 402) may be composed of a relatively harder (e.g., less compressible) material, such as the fiber reinforced material (e.g., an elastomeric material infused with fibers) discussed herein. In such embodiments, the sealing element 592 can be sized to align with the overall dimensions of a valve body 594 to which the sealing element 592 is secured. In other words, the sealing element 592 may be manufactured to have a contour that matches that of the valve body 594 (e.g., the recess 606 having the cutout 602) without having to implement additional geometric tolerancing that accommodates potential expansion of the sealing element 592 (e.g., during compression of the sealing element 592 against the valve body 594). Eliminating expansion may also allow for more precise dimensioning to enable the sealing element 592 and the valve body 594 to engage one another in a desirable manner (e.g., to be positioned flush against one another).

In additional or alternative embodiments, the sealing element 592 (e.g., the homogenous elastomeric sealing element 354) may be composed of a relatively softer (e.g., more compressible) material, such as a polymer. In such embodiments, the cutout 602 might be configured to allow expansion of the sealing element 592 (e.g., of the protrusion 604), which may be unnecessary with a relatively harder material. That is, the sealing element 592 may be manufactured (e.g., with greater geometric tolerancing) to accommodate potential expansion of the sealing element 592. Expansion of the sealing element 592 may then cause the sealing element 592 to extend farther into the cutout 602 and/or cause the sealing surface 596 of the sealing element 592 to become substantially coplanar/collinear with the sealing section 598 of the valve component 590.

Figure 11B:
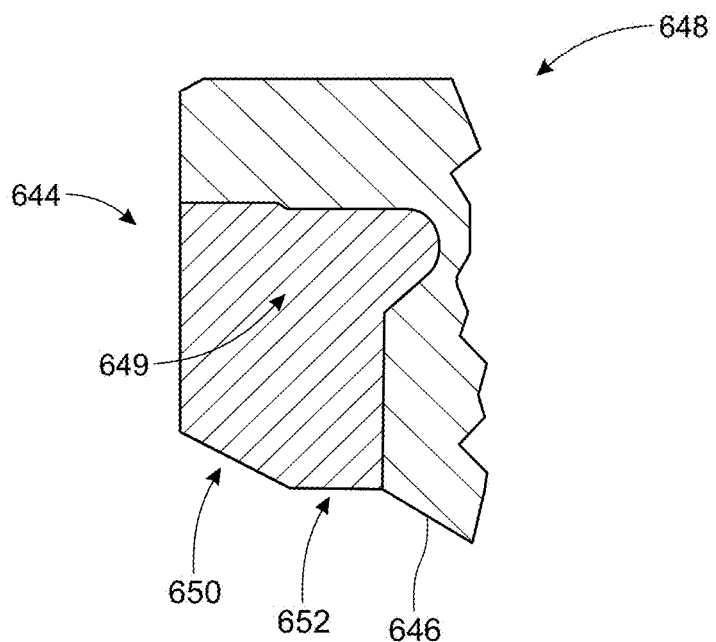
FIG. 11B shows a side sectional view of a portion of a prior art sealing element installed on a valve component, which is representative of detail area B included in FIG. 1B.

FIG. 11B, which is representative of detail area B included in FIG. 1B, illustrates a prior art sealing element 644, which extends beyond (e.g., planarly or linearly offset to) a sealing section 646 of a valve component 648 on which the sealing element 644 is included, such as via positioning within a recess 649 defined by the valve component 648. For example, the sealing element 644 includes an angled section 650 being separated from the sealing section 646 of the valve component 648 by a flat section 652. In other words, the angled section 650 of the sealing element 644 is offset from the sealing section 646 of the valve component 648 such that the angled section 650 and the sealing section 646 are not coplanar/collinear to one another in an assembled configuration of the valve component 648. Then, when the valve component 648 is moved into a closed position with respect to the valve seat 352, the portion of the sealing element 644 (e.g., the angled section 650) extending beyond the sealing section 646 of the valve component 648 may be compressed farther into the recess 649 defined by the valve component 350. However, such compression of the sealing element 644 may impart an excessive amount of force onto the sealing element 644 and/or onto the valve component 648 (e.g., as a result of transfer of force from the sealing element 644), which may increase wear of the sealing element 644 and/or of the valve component 648.

Figure 11C:
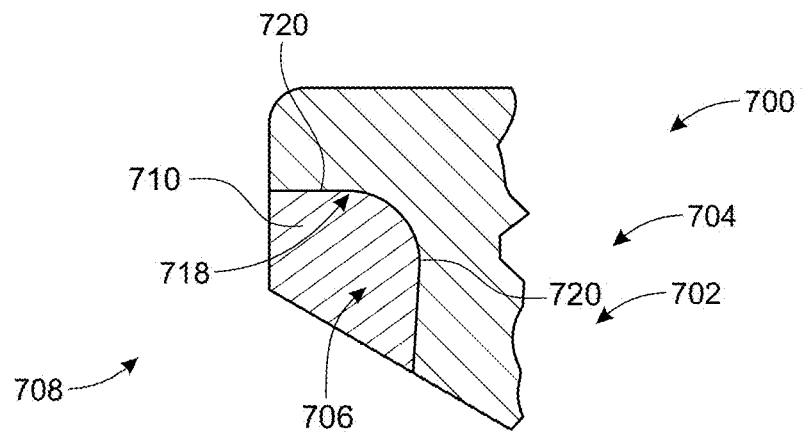
FIG. 11C shows a side sectional view of a portion of another example embodiment of a fiber reinforced sealing element installed on a valve component.
Figure 11D:
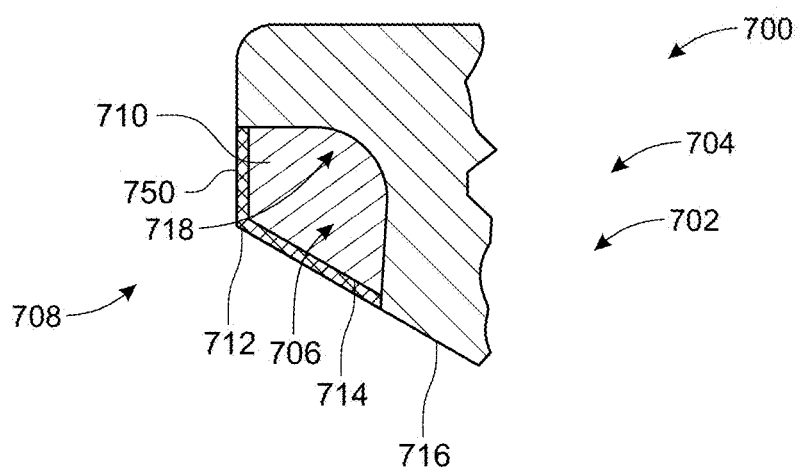
FIG. 11D shows a side sectional view of a portion of yet another example embodiment of a fiber reinforced sealing element installed on a valve component.
Figure 11E:
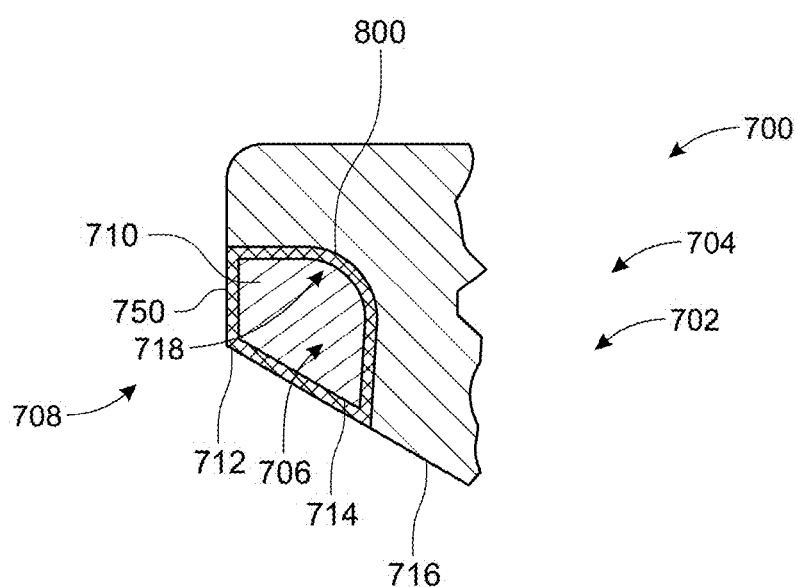
FIG. 11E shows a side sectional view of a portion of still another example embodiment of a fiber reinforced sealing element installed on a valve component.

Each of FIGS. 11C, 11D, and 11E illustrates a valve component 700 having a valve body 702 with a base portion 704 that defines a recess 706 configured to receive a sealing element 708 (e.g., a fiber reinforced sealing element) having a base material 710 (e.g., an elastomeric material). Moreover, the recess 706 does not include a cutout extending into the base portion 704. Instead, for instance, the base portion 704 forms an arc 718 extending between two generally linear sections 720 (e.g., linear sections 720 that do not overlap or extend inwardly beyond one another), and the arc 718 has a greater radius than a radius of the cutout 602. The increased radius of the arc 718 may reduce concentration of stress (e.g., caused by impact between the valve component 700 and the valve seat 352). As a result, structural deformation of the valve component 700 (e.g., of the base portion 704) may be reduced, thereby increasing a useful lifespan of the valve component 700.

The illustrated valve component 700 of FIG. 11D includes the sealing element 708 positioned in the recess 706 of the base portion 704. However, the illustrated sealing element 708 includes a woven fabric 712 applied to the base material 710. As an example, the woven fabric 712 (e.g., the woven fabric 404 having aramid strands/threads/fibers) is wrapped around, bonded to, and/or adhered to the base material 710. For instance, the woven fabric 712 is applied to an angled sealing surface 714 and a lateral surface 750 (e.g., a laterally exterior surface) of the base material 710. The woven fabric 712 may contact the sealing surface 360 of the valve seat 352 while the valve component 700 is in the closed position with respect to the valve seat 352. Thus, the woven fabric 712 provides a surface that is resistant to abrasion and/or tearing, which may otherwise occur during operation of the valve assembly, such as during impact between the valve component 700 and the valve seat 352. The woven fabric 712 may be arranged (e.g., positioned on the base material 710, trimmed) to be coplanar/collinear to a sealing section 716 of the base portion 704 in an assembled configuration of the valve component 700.

The lateral surface 750 is generally not in contact with the valve seat 352 in the closed position of the valve component 700, but among other advantages, application of the woven fabric 712 to the lateral surface 750 may restrict movement of the base material 710 away from the recess 706 to block radial expansion of the base material 710 in the closed position of the valve component 700. As such, structural deformation of the sealing element 708 may be further reduced to increase a useful lifespan of the valve component 700. Additionally, the illustrated sealing element 708 does not include a protrusion to enable the sealing element 708 to align with the arc 718 and the linear sections 720 of the recess 706.

The illustrated valve component 700 of FIG. 11E includes the sealing element 708 positioned in the recess 706 of the base portion 704, and the illustrated sealing element 708 includes the woven fabric 712 applied to the sealing surface 714, the lateral surface 750, and a valve engaging surface 800 of the base material 710. Application of the sealing element 708 to the valve engaging surface 800 may further block radial expansion of the base material 710 to increase a useful lifespan of the valve component 700. For instance, the sealing element 708 may define an outer boundary of the base material 710 and may constrict the base material 710 within the outer boundary to block deformation of the base material 710.

It should be noted that the woven fabric 712 may be applied to any other portion of the base material 710 in additional or alternative embodiments. For example, in some embodiments, the woven fabric 712 may be applied to the lateral surface 750 and/or to the valve engaging surface 800, but not to the sealing surface 714. Indeed, the woven fabric 712 may be selectively applied to specific portions of the base material 710, such as based on operating parameters of the valve component 700, thereby providing different possible embodiments of the sealing element 708 that may be more suitable to its implementation.

Figure 11F:
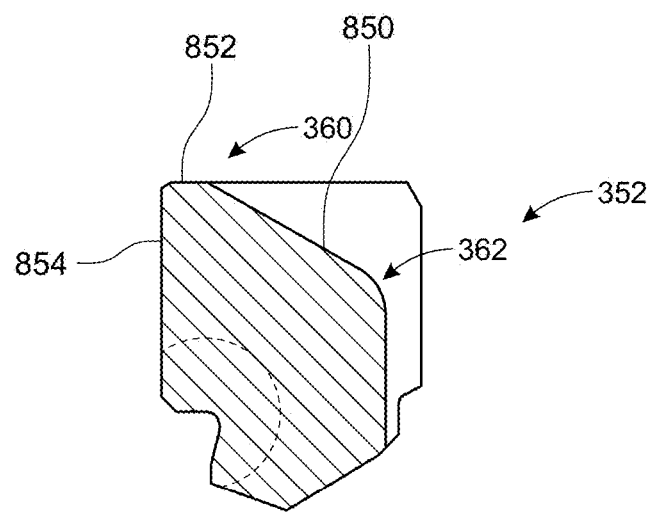
FIG. 11F shows a side sectional view of a portion of a prior art valve seat that defines at least a portion of a sealing surface on which a prior art sealing element can selectively seal.
Figure 11G:
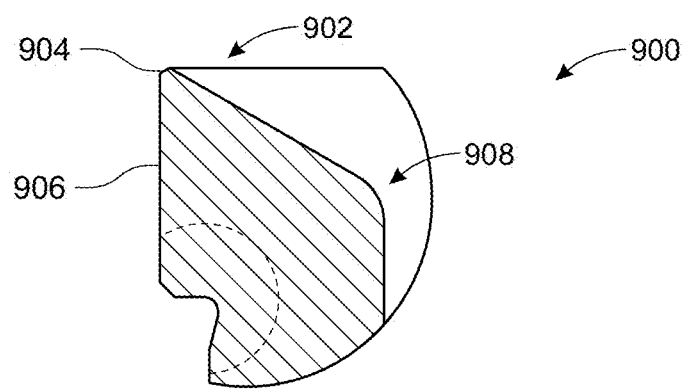
FIG. 11G shows side sectional view of a portion of an example embodiment of a valve seat that defines at least a portion of a sealing surface on which an example embodiment of a fiber reinforced sealing element can selectively seal.

Furthermore, now turning to FIGS. 11F and 11G, the geometry of a valve seat of a valve assembly presented herein may have features to accommodate the sealing element construction presented herein. For example, as is shown in FIG. 11F, at least some prior art valve seats 352 may include a sealing surface 360 with an angled section 850 connected to a flattened outer section 852 that allows radial expansion of a sealing element (e.g., the homogeneous elastomeric sealing element 354) composed of a relatively softer and/or more compressible material. For instance, the flattened outer section 852 may accommodate expansion of the sealing element in an outward direction away from the central bore 362 of the valve seat 352, and such expansion of the sealing element may enable the homogeneous elastomeric sealing element 354 to maintain contact with the scaling surface 360. That is, deformation of the sealing element may cause a contour of the sealing element to match that of the sealing surface 360. The flattened outer section 852 is connected to a lateral surface 854 of the valve seat 352. Thus, the flattened outer section 852 offsets the angled section 850 from the lateral surface 854.

By comparison, another valve seat 900 of a valve assembly presented herein might include a sealing surface 902 with a constant taper/angle (e.g., devoid of any flattened section), an example of which is depicted in FIG. 11G. The constant taper of the sealing surface 902 may enable a sealing element (e.g., the fiber reinforced sealing element 402) to be positioned flush against the sealing surface 902 without having to radially expand, e.g., since the outermost portion of the sealing element will not depend on imprecise radial expansion of its material. In other words, the contour of the sealing element (e.g., a constant flat sealing surface) matches that of the sealing surface 902 without deforming. An arcuate portion 904 of the valve seat 900 offsets the sealing surface 902 from a lateral surface 906 of the valve seat 900, the lateral surface 906 and the sealing surface 902 extending obliquely relative to one another. A distance in which the arcuate portion 904 offsets the sealing surface 902 from the lateral surface 906 may be less than a distance in which the flattened outer section 852 offsets the angled section 850 from the lateral surface 854. The closer positioning of the angled sealing surface 902 relative to the lateral surface 906 may block outward expansion of a sealing element away from a central bore 908 of the valve seat 900. The valve seat 900 of FIG. 11G may be easier to manufacture since it may include smaller or fewer rounded corners as a result of the arcuate portion 904 extending between the sealing surface 902 and the lateral surface 906.

Figure 12:
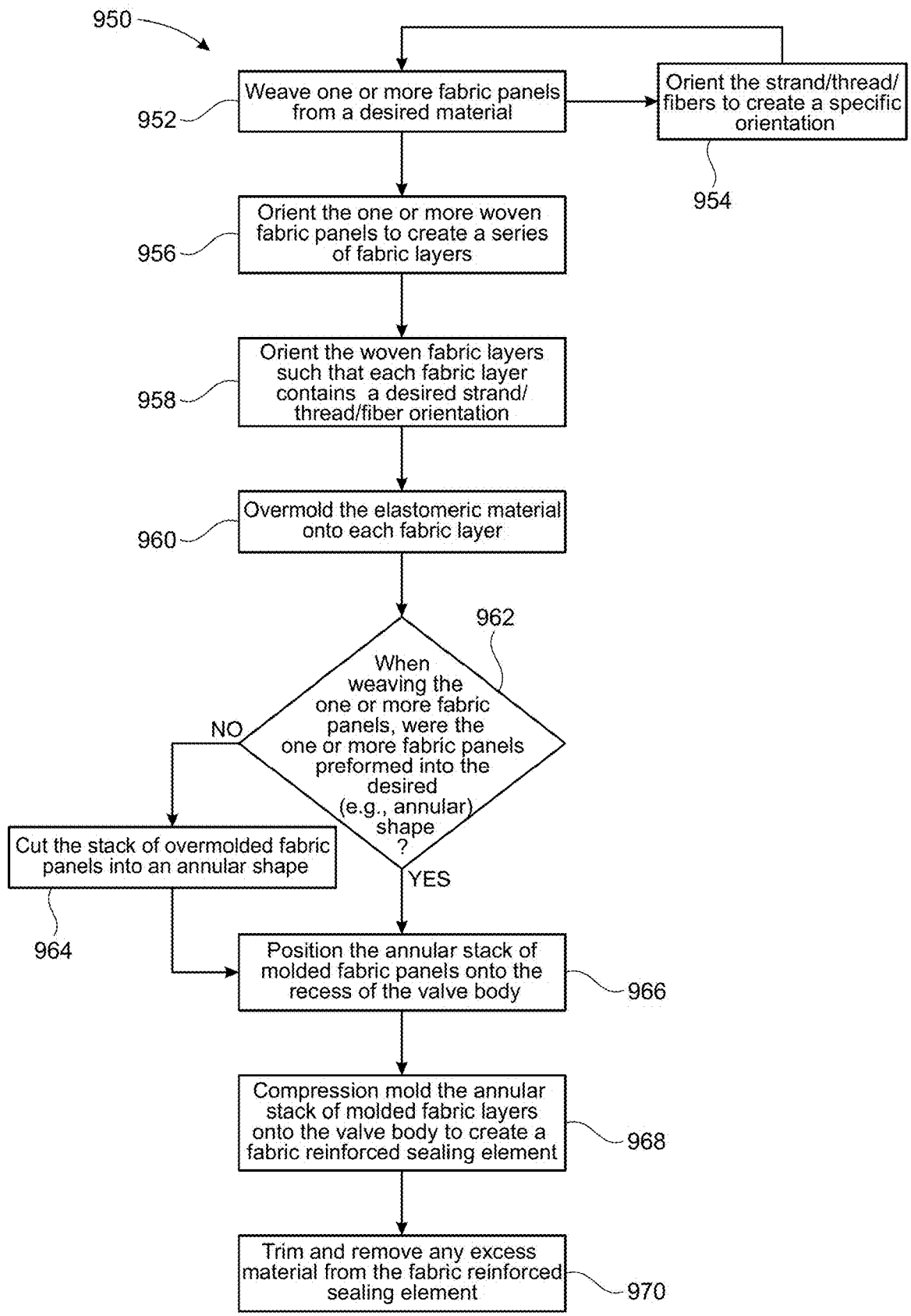
FIG. 12 illustrates a flowchart of the manufacturing process of a valve component equipped with a fiber reinforced sealing element.

Turning to FIG. 12, illustrated is a flowchart depicting the manufacturing process 950 of the valve component with the reinforced sealing element in accordance with the techniques described herein. As previously explained, the manufacturing process 950 begins at block 952 by weaving one or more fabric panels from a desired material such as, for example, aramid. This could include weaving multiple fabric panels (e.g., for the embodiment where the preform is constructed from stacking multiple woven fabric panels on top of one another) or weaving a single continuous helical fabric panel. As mentioned (and as depicted in FIG. 12), this process may, in some instances, include orienting, or involve the orientation of, fibers/threads/strands of a desired material such as, for example, aramid, e.g., to create a specific directionality/pattern of the desired material (e.g., to maximize strength of the fabric), as shown at block 954. Once the one or more fabric panels have been woven, at block 956, the one or more fabric panels may be oriented to create a series of fabric layers like that illustrated in FIG. 7B. In the event that multiple fabric panels were woven, those fabric panels are stacked atop one another. In the event that a single continuous helical panel was woven, the single continuous woven panel may spiral around a central axis such that several layers are deposited atop one another. When creating the series of fabric layers, the layers may be, but do not necessarily need to be (hence the dashed lines), further oriented such that the strands/threads/fibers of each layer are oriented in a desired direction, as shown at block 958. For example, in some embodiments, the strands/threads/fibers of each fabric layer may be oriented to radially extend from a central axis of the series of fabric layers. Once the series of layers have been created, and once the strand/threads/fibers have been placed in the desired orientation, each fabric layer of the series of fabric layers may be overmolded with an elastomeric material such that the elastomeric material penetrates the weave of each fabric layer, as shown at block 960. Additionally or alternatively, elastomeric impregnation may be achieved with other techniques, such as calendering, knife-over-roll, roll-over-roll, and/or dip coating. At block 962, a determination is made regarding whether the fabric panels were woven into the desired final shape for the preform.

At block 964, in the event that the one or more fabric panels were not woven into the desired final shape for the preform, then the series of overmolded fabric layers may be cut into a desired shape (e.g., an annular shape). However, at block 966, if the one or more fabric panels were woven into the desired final shape for the preform, or after cutting the series of overmolded fabric layers into the desired shape of the preform, the preform may be positioned onto the recess of the valve body like that illustrated in FIG. 8. At block 968, with the preform disposed on the recess of the valve body of the valve component, the preform may be compression molded to the valve body in order to create a fiber reinforced sealing element like that illustrated in FIG. 9. Finally, at block 970, after compression molding, the fiber reinforced sealing element may be trimmed to remove any excess material such that the fiber reinforced sealing element creates a continuous sealing surface with the sealing section of the valve body like that illustrated in FIG. 10A. In addition, the fiber reinforced sealing element may also be trimmed such that the outer perimeter of the fiber reinforced sealing element forms a continuous outer perimeter of the valve body in conjunction with the outer perimeter of the second member of the valve body like that illustrated in FIG. 10B.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the valve component, valve body, and sealing element described herein may be modified to be of any shape. Moreover, the sealing element may be reinforced with any number of fabric layers, and may be constructed with any fabric material and with any elastomeric material.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the fluid pump described herein, the fluid end assembly described herein, the valve components, valve body, and sealing element described herein, or portions thereof, may be fabricated from any suitable material or combination of materials, such as, but not limited to, plastics, metals (e.g., nickel, copper, bronze, aluminum, steel, etc.), metal alloys, elastomeric materials, etc., as well as derivatives thereof, and combinations thereof, unless otherwise specified. In addition, it is further to be understood that the steps of the methods described herein may be performed in any order or in any suitable manner.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. A valve component for a reciprocating pump, comprising:
   a body comprising a tapered sealing section, a first linear section, a second linear section, and an arc extending between the first linear section and the second linear section to define a recess, wherein the first linear section is planar and extends radially inward from a lateral outer surface to the arc, the second linear section extends transverse to the first linear section to the arc, and the first linear section and the second linear section do not overlap with one another such that the recess lacks a cutout extending into the body; and a sealing element configured to be positioned within the recess, wherein the sealing element comprises a sealing surface that is coplanar to the tapered sealing section of the body to form a valve sealing surface with the body in an assembled configuration of the valve component.

2. The valve component of claim 1, wherein the body comprises:

a first portion comprising the tapered sealing section; and a second portion connected to the first portion, wherein the second portion is offset from the tapered sealing section to define the recess between the tapered sealing section and the second portion.

3. The valve component of claim 2, wherein the sealing element extends from the second portion to the tapered sealing section of the first portion to form the valve sealing surface with the tapered sealing section.

4. The valve component of claim 2, wherein the sealing element comprises an annular ring shape that surrounds the first portion.

5. The valve component of claim 1, wherein the second linear section extends obliquely to the tapered sealing section.

6. The valve component of claim 1, wherein the sealing element lacks a protrusion extending into the recess.

7. The valve component of claim 1, wherein the first linear section is approximately perpendicular to the lateral outer surface.

8. The valve component of claim 1, wherein the second linear section extends from the tapered sealing section to the arc.

9. A valve assembly, comprising:

a valve seat defining a bore and comprising a first tapered sealing surface; and a valve component comprising:

a body comprising a tapered sealing section, a first linear section, a second linear section, and an arc extending between the first linear section and the second linear section to define a recess, wherein the first linear section is planar and extends radially inward from a lateral outer surface to the arc, the second linear section extends transverse to the first linear section to the arc, and the first linear section and the second linear section do not overlap with one another such that the recess lacks a cutout extending into the body; and a sealing element secured to the body and comprising a second tapered sealing surface, wherein at least one of the tapered sealing section or the second tapered sealing surface is configured to abut the first tapered sealing surface of the valve seat in a closed position of the valve component.

10. The valve assembly of claim 9, wherein the body comprises:

a first portion comprising the tapered sealing section; and a second portion offset from the tapered sealing section to define the recess between the tapered sealing section and the second portion, wherein the sealing element is positioned within the recess to secure to the body of the valve component.

11. The valve assembly of claim 10, wherein the tapered sealing section of the first portion is oriented at a first angle with respect to the second portion, the second tapered sealing surface of the sealing element is oriented at a second angle with respect to the second portion, and the first angle and the second angle are equal to one another.

12. The valve assembly of claim 11, wherein the tapered sealing section of the first portion and the second tapered sealing surface of the sealing element are coplanar to one another.

13. The valve assembly of claim 12, wherein the sealing element is composed of a compressible material such that compression of the sealing element causes the second tapered sealing surface of the sealing element to be oriented coplanar to the tapered sealing section of the first portion.

14. The valve assembly of claim 10, wherein the sealing element lacks a protrusion extending into the recess.

15. The valve assembly of claim 10, wherein the sealing element surrounds the first portion.

16. The valve assembly of claim 9, wherein both the tapered sealing section and the second tapered sealing surface are configured to abut the first tapered sealing surface of the valve seat in the closed position of the valve component.

17. The valve assembly of claim 9, wherein the valve seat comprises a lateral surface and an arcuate portion extending from the lateral surface to the first tapered sealing surface.

18. The valve assembly of claim 9, wherein the second linear section and the tapered sealing section are oriented at an obtuse angle with one another.

19. The valve assembly of claim 18, wherein the first linear section and the second linear section form an acute angle with one another.

20. The valve assembly of claim 9, wherein the first linear section is approximately perpendicular to the lateral outer surface.

* * * * *